United States Patent [19]

Daeschel et al.

[11] Patent Number: 5,059,431

[45] Date of Patent: Oct. 22, 1991

[54] PROCESS FOR DEACIDIFYING WINE

[75] Inventors: Mark A. Daeschel; Barney T. Watson, both of Corvallis, Oreg.

[73] Assignee: State of Oregon acting by and through the State Board of Higher Education on behalf of Oregon State University, Eugene, Oreg.

[21] Appl. No.: 624,061

[22] Filed: Dec. 7, 1990

[51] Int. Cl.$^5$ ........................... C12G 1/00; C12H 1/00
[52] U.S. Cl. ........................................ 426/13; 426/15; 426/9; 426/592
[58] Field of Search ........................ 426/13, 15, 592, 9

[56] References Cited

U.S. PATENT DOCUMENTS 4,547,373 10/1985 Sandine et al. ........................ 426/15
4,562,077 12/1985 King ....................................... 426/15
4,716,115 12/1987 Gonzalez et al. ................. 435/172.3

OTHER PUBLICATIONS

Wibowo et al., "Occurrence and Growth of Lactic Acid Bacteria in Wine: A Review", *Am. J. Enol. Vitic.* 36:302–313 (1985).
Henick-Kling et al., "Evaluation of Malolatic Bacteria Isolated from Oregon Wines", *Appl. Environ. Microbiol.* 55:2010–2016 (1989).
Watson, B., "Malolactic Fermentation, A Review of Current Practices, Problems, and Research at OSU", *Wine Advisory Board Research Report*, Wine Advisory Board, Oregon Dept. of Agric., Issue 2 (Jan. 1986).
Radler, F., "Possible Use of Nisin in Winemaking, I. Action of Nisin Against Lactic Acid Bacteria and Wine Yeasts in Solid and Liquid Media", *Am. J. Enol. Vitic.*, 41:1–6 (1990).
Radler, F., "Possible Use of Nisin in Winemaking, II. Experiments to Control Lactic Acid Bacteria in the Production of Wine", *Am. J. Enol. Vitic.*, 41:7–11 (1990).
Hurst, A., "Nisin and Other Inhibitory Substances from Lactic Acid Bacteria", in Branell and Davidson (eds.) *Antimicrobials in Foods*, Dekker, pp. 327–351 (1983).
Lipinska, E., "Nisin and Its Applications", in Woodbine (ed.) *Antibiotics and antibiosis in Agriculture*, Butterworth, pp. 103–130 (1977).
Hall, R. H., "Nisin and Food Preservation", *Process Biochem,* (Dec. 1966), pp. 461–464.
Ogden, K., "Nisin: A Bacteriocin with a Potential Use in Brewing", *J. Inst. Brew.* 92:379–383 (1986).
53 Fed. Reg. 11247–11251 (1988).
Watson and Heatherbell, "Update of Industry Trials with OSU Malolactic Bacteria", *1983 Proceedings of the Oregon Horticultural Society, 74th Annual Report*, pp. 292–297 (1983).
Watson et al., "Commercial Evaluation of Two New Oregon Strains of Malolactic Bacteria", in *Proceedings of the International Symposium on Cool Climate Viticulture and Enology, Oregon State University, pp. 516–529 (1984).*
Splittstoesser and Stoyla, "An Examination of Different Microbial Inhibitors for Synergistic Activity Against the Lactic Acid Bacteria That Spoil Wine", (Abstract) *Am. J. Enol. Vitic.* 40:76 (1989).
Henning et al., "New Aspects for the Application of Nisin to Food Products Based on its Mode of Action", *Intl. J. Food Microbiol.* 3:135–141 (1986).
Richard, J., "Do Local Bugs do it Best?"*Vineyard and Winery Management* (Nov.–Dec. 1990), p. 51.
Krieger et al., "Management of Malolactic Fermentation Using Starter Cultures", *Vineyard & Winery Mgmt.* (Nov.–Dec. 1990), pp. 45–50.
Henick-Kling, T., "Improving Malolactic Fermenation", *Proceedings of the Second International Symposium on Cool Climate Viticulture and Enology, Auckland, New Zealand, pp. 238–242 (Jan. 1988).*
Microlife Technics, Sarasota, FL, OENO ® Technical Bulletin.
Scott Laboratories, San Rafael, Calif, *Leuconostoc oenos* X-3 Instruction Bulletin.
Bio Logicals (U.S.A), Berkeley, Calif. 44.40 Malolactic Culture Instruction Bulletin.
CHR Hansen's Laboratory, Milwaukee, Wis, Viniflora–LP Instruction Bulletin (includes paper by Prahl, "Viniflora–A New Way of Inducing Malolactic Fermentation in Must by Direct Inoculation with Homofermetative Lactobacilli".

*Primary Examiner*—Marianne Cintins
*Attorney, Agent, or Firm*—Klarquist, Sparkman, Campbell, Leigh & Whinston

[57] ABSTRACT

A method is disclosed for deacidifying wine using malolactic fermentation (MLF) under conditions inhibitory for spoillage lactic acid bacteria (LAB), making possible a "pure culture" MLF in which a winemaker is provided with a way to control the timing of onset and the outcome of wine MLF. The method comprises adding nisin to the wine at a concentration lethal to nisin-sensitive LAB, adding to the wine an inoculum of nisin-resistant LAB mutants capable in the presence of nisin of converting malic acid to lactic acid, and maintaining the inoculated wine under conditions in which the MLF can occur. Afterward, nisin can be removed from the wine by contacting the wine with a nisin-removing substance, such as bentonite. The nisin can be added either before or simultaneously with addition of the nisin-resistant LAB, at any time during winemaking, including primary yeast fermentation.

38 Claims, No Drawings

PROCESS FOR DEACIDIFYING WINE

FIELD OF THE INVENTION

This invention relates to winemaking. In particular, it relates to controlling the acidity of finished wine while inhibiting the growth of undesirable lactic acid bacteria in the wine.

BACKGROUND OF THE INVENTION

In winemaking, controlling the final acidity of the wine can be important, particularly to impart complexity of aroma and flavor and to increase biological stability of the wine. For example, red and white wines produced in cooler climatic regions frequently have excess acidity, principally because of elevated levels of malic acid in the wine. Such acidic wines usually require deacidification. Wines produced in warmer climates generally have lower acidity. Consequently, they often do not require deacidification.

Malolactic fermentation (MLF) is a metabolic process performed by certain lactic acid bacteria (LAB), which can be utilized to reduce wine acidity. In this process, malic acid (which has two carboxylic acid groups) is decarboxylated to form lactic acid (which has only one carboxylic acid group) and carbon dioxide. In the decarboxylation reaction, a proton ($H^+$) becomes covalently bonded to the lactic acid. Since protons in the wine are thereby consumed, wine pH is correspondingly increased.

The LAB capable of performing MLF are principally from the genera Leuconostoc, Lactobacillus, and Pediococcus. Such bacteria exist naturally, along with other bacteria, on the surfaces of grape leaves and skins. Wibowo et al., "Occurrence and Growth of Lactic Acid Bacteria in Wine: A Review," *Am. J. Enol. Vitic.* 36:302–313 (1985). However, relying on indigenous populations of LAB comprising multiple species, some of which perform undesirable metabolic reactions on wine constituents, to perform MLF can be risky because many indigenous LAB species produce undesirable flavors and odors in wines. In addition, growth of indigenous LAB in wine can result in other forms of wine spoilage such as ropiness (formation of mucilaginous material) and formation of excess acetic acid. Suppression of LAB species can be achieved in some instances by maintaining a wine pH of less than about 3.3, an alcohol content greater than about 14% v/v, and a sulfur dioxide concentration greater than about 50 mg/L. However, these conditions may be neither desirable nor feasible for many wines.

As a result, many winemakers faced with the problem of acid reduction in a new wine inoculate the wine with a pure starter culture comprised of a suitable LAB, particularly *Leuconostoc oenos*. *L. oenos* is the only known species of LAB capable of growing and degrading malic acid in low pH environments (less than about 3.5) and in the presence of ethyl alcohol. Henick-Kling et al., "Evaluation of Malolactic Bacteria Isolated from Oregon Wines," *Appl. and Environm. Microbiol.* 55:2010–2016 (1989); Watson, "Malolactic Fermentation," *Wine Advisory Bd. Res. Rept.*, Issue 2, Oregon Dept. of Agric. (Jan. 1986). Using pure starter cultures has the advantage of not having to rely on the uncertain prospects of employing a mixed population of indigenous LAB to decarboxylate malic acid. However, use of pure starter cultures alone provides no assurance that undesirable LAB that may be present in the wine will not propagate and eventually spoil the wine, especially after MLF has progressed sufficiently to elevate the pH to a level permissive for such propagation.

*L. oenos* starter cultures are typically prepared by growing a population of the bacteria in an aqueous culture medium. A volume of the starter culture is then added to the wine, generally during or after the primary fermentation is complete. Although *L. oenos* can withstand a wine environment, after a starter culture thereof is added to the wine, certain strains of these bacteria comprising the inoculum can experience a substantial shock resulting from their being transferred from a relatively mild culture-medium environment to a wine environment. As a result, the bacteria can experience a partial decline in numbers, followed by a recovery of viable bacteria. After the LAB population density subsequently reaches about $10^6$ cells/mL, MLF becomes pronounced. See Wibowo et al., *Am. J. Enol. Vitic.* 36:302–313 (1985).

In view of the partial die-off of inoculum bacteria, many winemakers inoculate the wine with a starter culture comprising a large number of viable *L. oenos* bacteria in the hope that MLF will begin rapidly and the inoculum bacteria will be able to overwhelm the activity of any undesirable LAB in the wine. However, use of a large starter culture provides no guarantee that undesirable LAB will be sufficiently outnumbered so as to have a negligible detrimental effect on the wine.

Many winemakers attempt to inhibit LAB and other bacteria as well as spoilage yeast in wine by adding sulfur dioxide ($SO_2$) thereto. This is a widespread practice. Unfortunately, sulfur dioxide also inhibits *L. oenos* and is a substance to which some people are sensitive or allergic. Since such people must avoid drinking wine containing sulfur dioxide, it is not surprising that many wine producers would like to reduce or eliminate use of sulfur dioxide. Nevertheless, these same winemakers have persisted in using sulfur dioxide because there has as yet been no feasible alternative for controlling undesirable LAB in a consistent and predictable manner, especially in wines that have been minimally processed.

Recent studies have shown that wine LAB can be inhibited by a bacteriocin termed "nisin." Radler, "Possible Use of Nisin in Winemaking. I. Action of Nisin Against Lactic Acid Bacteria and Wine Yeasts in Solid and Liquid Media," *Am. J. Enol. Vitic.* 41:1–6 (1990); Radler, "Possible Use of Nisin in Winemaking. II. Experiments to Control Lactic Acid Bacteria in the Production of Wine," *Am. J. Enol. Vitic.* 41:7–11.

Nisin is produced by *Streptococcus lactis* bacteria, which belong to the serological group N. The term "nisin" is derived from the phrase "N inhibitory substance." Hurst, "Nisin and Other Inhibitory Substances from Lactic Acid Bacteria," in Branell et al. (eds.) *Antimicrobials in Foods*, Dekker, pp. 327–351 (1983). Nisin is not active against gram-negative bacteria, fungi or yeasts. It is active against virtually all LAB. The mechanism of nisin action is presently not fully understood, although it appears to cause rupture of bacteria cell membranes.

The nisin polypeptide is generally regarded as a dimer having a molecular weight of about 7000 daltons and is comprised of 34 amino acid residues, some of which are rare in nature. Lipinska, "Nisin and Its Applications," in Woodbine (ed.) *Antibiotics and Antibiosis in Agriculture*, Butterworth, London, pp. 103–130 (1977).

Nisin has achieved widespread acceptance outside the United States as a preservative in foods, especially in dairy products and canned vegetables and meats. Hall, "Nisin and Food Preservation," *Process Biochem.* (Dec. 1966), pp. 461–464. In fact, nisin occurs naturally in certain foods, especially dairy products, that are made by a process that includes a fermentation step involving *S. lactis*. A recent report espouses the use of nisin in beer brewing, where the bacteriocin limits undesired LAB without affecting yeast fermentation or beer flavor. Ogden, "Nisin: A Bacteriocin with a Potential Use in Brewing," *J. Inst. Brew.* 92:379–383 (1986).

After 25 years of safe use in many European countries, nisin was recently affirmed by the Food and Drug Administration as Generally Recognized As Safe (GRAS) for use in inhibiting growth of *Clostridium botulinum* in pasteurized process cheese spreads. See 53 Fed. Reg. 1247–11251 (1988). This action was based on the large accumulated body of scientific data indicating that nisin is non-toxic, non-allergenic, and is a safe and effective antimicrobial agent.

Unfortunately, nisin is active against many bacteria capable of performing MLF in wine. For example, *L. oenos* will not grow at nisin concentrations greater than about 1 Unit/mL.

Nisin production is governed by at least one DNA sequence present in nisin-producing microorganisms such as *S. lactis*. The DNA sequence is apparently borne on a plasmid, which can be transferred to other microorganisms via gene cloning techniques known in the art. For example, U.S. Pat. No. 4,716,115 to Gonzalez et al. discloses the transfer of nisin-encoding DNA into recipient microorganisms that naturally lack the ability to produce the bacteriocin. The resulting "transformed" recipient microorganisms thereby become nisin-producing. Gonzalez et al. discloses that incorporation of nisin genes into nisin-resistant lactic acid bacteria can yield nisin-producing transformants usable for preserving foods such as meat and dairy products. However, Gonzalez et al. does not disclose how to generate nisin-resistant LAB capable of conducting MLF in wine.

Hence, there is a need for a method for reducing the acidity of wine by malolactic fermentation wherein the winemaker has complete control over when during a winemaking process a malolactic fermentation step occurs, particularly without the hazard of wine spoilage due to the unintentional propagation of harmful bacteria in the wine.

There is also a need for such a method in which malolactic fermentation of the wine can be performed by inoculating the wine with a "pure culture" of a suitable lactic acid bacteria without the need to pre-sterilize the wine in an effort to suppress the propagation of wine-spoilage bacteria.

There is also a need for such a method that does not detrimentally alter the taste or aroma of the wine.

SUMMARY OF THE INVENTION

In view of the needs stated hereinabove, an object of the present invention is to provide a method for reducing the acidity of wine wherein "pure culture" malolactic fermentation of the wine is performed by inoculating the wine with nisin and a nisin-resistant mutant strain of *Leuconostoc oenos*, thereby providing the winemaker with a way to predictably control when during the winemaking process a malolactate fermentation step will be conducted and the outcome of such a step.

A further object is to provide such a method in which the concentration of nisin in the inoculum is toxic to nisin-sensitive wine-spoilage bacteria.

A further object is to provide such a method in which the nisin-resistant mutants of *Leuconostoc oenos* are generated by culturing nisin-sensitive *Leuconostoc oenos* bacteria in the presence of increasingly greater concentrations of nisin to select for spontaneously arising nisin-resistant mutants of such bacteria.

A further object is to provide such a method in which the nisin and nisin-resistant mutants of *Leuconostoc oenos* can be added to the wine at any time, including during the primary yeast fermentation.

A further object is to provide such a method in which the nisin can be added to the wine sooner than the inoculum of nisin-resistant mutants of *Leuconostoc oenos*, thereby inhibiting propagation in the wine of undesirable lactic acid bacteria before, during, and after a subsequent malolactic fermentation.

A further object is to provide such a method that is substantially unaffected by wine acidity and alcohol content.

A further object is to provide such a method that can be performed within a reasonable time at a "cellar temperature" without having to heat the wine.

A further object is to provide such a method wherein the nisin can be removed from the wine, if desired, after the malolactic fermentation of the wine is completed.

A further object is to provide such a method that can be performed on a wine while the wine is undergoing aging.

These and other objects are achieved by the present invention which pertains to a method for reducing the acidity of wine using malolactic fermentation (MLF) under conditions in which lactic acid bacteria that can cause wine spoilage are prevented from propagating in the wine. In particular, the MLF is performed using a nisin-resistant mutant strain of a species of lactic acid bacteria (LAB) capable of conducting MLF in wine in the presence of nisin. The preferred bacterial species is *Leuconostoc oenos* (*L. oenos*). Since *L. oenos* (or other desired LAB) is naturally sensitive to nisin, mutants of the bacteria are selected for and used which are resistant to an otherwise lethal concentration of nisin. This invention makes possible for the first time a "pure culture" MLF of wine without the need to pre-sterilize the wine. This invention also for the first time provides the winemaker with a way to control the timing of onset and the outcome of MLF of a wine, thereby providing greater certainty of producing a marketable and a microbially stable wine.

One embodiment of the present method comprises the steps of adding nisin to the wine to inhibit growth therein of naturally occurring LA species; adding to the wine an inoculum comprised of a nisin-resistant mutant of a species of LAB capable of growing in wine, such as *L. oenos*, having the capability in the presence of nisin of converting malic acid to lactic acid; and maintaining the wine at conditions allowing the nisin-resistant mutant bacteria to convert either a portion of or substantially all the malic acid to lactic acid. If desired, the nisin can be removed from the wine before the wine is bottled. The nisin and the inoculum can be added to the wine substantially simultaneously or the nisin can be added before the inoculum to inhibit undesirable LAB propagation in the wine that could occur before MLF is begun. The method can be performed at any time during the winemaking process, including during the primary yeast fermentation. Also, the method can be used on any type of grape wine having excess acidity due to malic acid.

Another embodiment of the present method comprises the steps of culturing nisin-sensitive LAB, such as *L. oenos*, in the presence of nisin to select for a bacterial population comprised of nisin-resistant mutants of the LAB; isolating a pure-culture subpopulation of the nisin-resistant mutants; adding to the wine the nisin and an inoculum comprised of the pure-culture subpopulation; maintaining the wine under conditions allowing the mutant bacteria to convert malic acid in the wine to lactic acid, thereby reducing the acidity of the wine, while the nisin inhibits the propagation of nisin-sensitive wine-spoilage bacteria. If desired, the nisin can be removed from the wine after MLF is completed.

The preferred concentration of nisin in the wine is about 100 Units/mL of wine, a concentration which is lethal to substantially all nisin-sensitive wine-spoilage LAB. Since virtually the only LAB survivors will be the mutants comprising the inoculum that are resistant to such a concentration of nisin, a "pure" culture of the desired beneficial LAB is thereby established and maintained in the wine.

Nisin-resistant mutants of *L. oenos* preferably originate from nisin-sensitive *L. oenos* strains Ey2d and Er1a. However, other strains of *L. oenos* and possibly other suitable LAB can also be used, depending upon the wine variety and conditions of winemaking. Spontaneously arising nisin-resistant mutants are selected for by culturing a suitable strain in a nutrient medium having a nisin concentration that begins at about zero and is increased in a stepwise manner to an otherwise lethal level, generally about 100 Units/mL.

The nisin-resistant mutants are preferably added to the malic acid-containing wine at an inoculum concentration that will yield a concentration of the mutants in the wine of within a range of about $10^4$ to about $10^7$ colony-forming units (CFU) per mL of wine.

The step of removing the nisin from the wine comprises contacting the wine with a nisin-removing substance, preferably a nisin-adsorbing substance. A preferred nisin-adsorbing substance is bentonite, which is a particulate material already used in many winemaking processes for fining proteinaceous material from wine. The concentration of bentonite is preferably greater than about 0.012% w/v relative to the wine. A convenient concentration range is from about 0.012% w/v to about 0.060% w/v, which is the typical concentration range used for fining other substances from wine.

Nisin can also be removed from the wine by adding a nisin-inactivating substance to the wine. Examples of nisin-inactivating substances include acid proteases.

Most of the population of nisin-resistant mutants tend to eventually form a sediment in the wine and can be removed from the wine by racking, if desired.

DETAILED DESCRIPTION

The present invention involves the first known use of a nisin-resistant "pure culture" inoculum of malolactic fermentation (MLF) lactic acid bacteria (LAB) for performing acidity reduction in wine. The present invention can be used to reduce the acidity of virtually any wine, particularly wine made from grapes, and further particularly red wines. White wines can also be de-acidified, depending on the style and type of the wine.

The fact that inocula according to the present invention are nisin resistant makes it possible for the first time to keep the bacterial population in a wine undergoing MLF predictably and completely limited to the desired MLF bacteria without having to pre-sterilize the wine before inoculation. As is generally known by winemakers, attempting to sterilize wine by heating destroys the wine, and passing a wine through a sterilizing filter can damage a wine by a phenomenon termed "stripping."

The nisin-resistant "pure cultures" according to the present invention are able to withstand the hostile environment presented in wine: high titratable acidity (pH about 3.5 or less), presence of about 8 to about 14% v/v ethyl alcohol, the necessity of maintaining the wine at a relatively low temperature (about 10° to 20° C.) during production and aging, and the nearly total absence of nutrients for bacterial growth. Different bacterial strains, of course, will exhibit different tolerances to these and other environmental parameters posed by wine. Also, not only are the nisin-resistant bacteria comprising the pure cultures capable of surviving and growing under such conditions, they are resistant to surprisingly high nisin concentrations (up to 100 Units of nisin per mL of wine) that are lethal to other LAB. In addition, the nisin-resistance mechanism in the desired MLF bacteria are functional under the same conditions. These results are surprising because bacterial resistance to a bacteriocin requires substantial expense of metabolic energy. One would expect that resistance to such concentrations of nisin would require that the mutants devote virtually all their metabolic resources to neutralizing the bacteriocin, leaving no resources for growth and reproduction.

The preferred MLF bacteria are nisin-resistant mutants of the normally nisin-sensitive species *Leuconostoc oenos* (*L. oenos*). *L. oenos* is one of the few known species of LAB that can perform MLF at pH less than 3.5 and in the presence of alcohol at a concentration normally found in wine. Also, certain nisin-resistant mutants according to the present invention can perform MLF at nisin concentrations as high as 100 Units/mL, possibly even higher. Fortunately, nisin, even at such high concentrations, contributes substantially no flavors or odors to wine. Radler, "Possible Use of Nisin in Winemaking. II. Experiments to Control Lactic Acid Bacteria in the Production of Wine," *Am. J. Enol. Vitic.* 41:7–11 (1990).

The nisin-resistant mutants of *L. oenos* were obtained by a selection procedure (described in detail below) that can be performed on any of a variety of nisin-sensitive *L. oenos* strains, depending on the particular type of wine to be produced. For example, we performed the selection procedure on *L. oenos* strains Ey2d and Er1a. These nisin-sensitive strains were first described by Watson and Heatherbell, "Update of Industry Trials with OSU Malolactic Bacteria," 1983 *Proceedings of the Oregon Horticultural Society, 74th Annual Report*, pp. 292–297 (1983); Watson et al., "Commercial Evaluation of Two Oregon Strains of Malolactic Bacteria," *Proceedings of the International Symposium on Cool Climate Viticulture and Enology*, Oregon State University, pp. 516–529 (1984); see also Henick-Kling, "Evaluation of Malolactic Bacteria Isolated from Oregon Wines," *Appl. & Environm. Microbiol.* 55:2010–2016 (1989). These strains are also the subject of U.S. Pat. No. 4,547,373 to Sandine et al. These strains were originally isolated from wines undergoing spontaneous MLF in two Oregon wineries, wherein the strains had superior MLF rates under the combination of conditions of pH as low as 3.0 and cool cellar temperatures. As a result, these strains were adjudged to be particularly suitable for performing MLF in wines produced under cool climatic conditions.

However, depending in part on the type of wine, the nisin-resistance selection procedure can be performed using other strains of *L. oenos* and strains of other LAB which may be more suitable for performing MLF on a different type of wine or a similar wine produced under different conditions. Such other strains include, but are not limited to:

1. *L. oenos* culture X-3 (a mixture of strains obtained from Scott Laboratories, Petaluma, Calif.).
2. "Inobacter Lalvin" strain CIVC (*L. oenos*) (produced by Lallemand, Montreal, Canada).
3. *L. oenos* strain MCW (obtained from Vinquiry Laboratories, Healdsburg, Calif.).
4. "Viniflora-LP" (*Lactobacillus plantarum*) (obtained from CHR Hansen's Laboratory, Inc., Milwaukee, Wis.)
5. *L. oenos* strains Ey2d (OSU-2) and Er1a (OSU-1) (obtained from W'yeast Laboratory, Hood River, Oreg.).
6. *L. oenos* strains ML-34, PSU-1 and additional unlicensed strains available in liquid culture from Vinquiry, Healdsburg, Calif.; ETS, St. Helena, Calif.; Wine Lab, St. Helena, Calif.; and Scott Labs, Petaluma, Calif.

Although *L. oenos* is the preferred bacterial species for performing MLF in wine, if the wine conditions are either intentionally or inadvertently changed, other LAB present in the wine could perform MLF or other reactions, which could spoil the wine or otherwise result in a degradation in flavor and other sensory characteristics of the wine. Hence, a particular advantage of the present invention is that it gives winemakers, for the first time, a way to perform MLF using "pure culture" *L. oenos* at conditions that would otherwise favor the propagation of undesirable LAB.

We obtained nisin-resistant mutants of *L. oenos* strains Ey2d and Er1a by individually culturing these nisin-sensitive strains in a liquid nutrient medium that was periodically augmented with stepwise increasing concentrations of nisin. In other words, the growth medium was augmented with increasing amounts of nisin in order to select for spontaneously arising nisin-resistant *L. oenos* mutants. The preferred nutrient medium was termed "Wine Lactic Acid Bacteria" (WLAB) medium and contained the following ingredients:

| | |
|---|---|
| "MRS" medium (Difco, Detriot, MI) | 27.5 g/L |
| Fructose | 5.0 g/L |
| L-malic acid | 1.0 g/L |
| Unfiltered V-8 juice (Campbell Soup Co.) | 10% w/v |

The pH of the WLAB medium was about 5.3 without adjustment. Following customary aseptic procedures, WLAB medium was autoclaved (sterilized) at 121° C. for at least 15 minutes before use. At each increase, the nisin concentration was increased by about 5 to 10 Units/mL, up to a maximum nisin concentration of 100 Units/mL.

The selection process can require several months to complete. Such a long time reflects in part the fact that the generation time of these bacteria is long: about 8 to 12 hours. Fortunately, selection can be done before the bacteria are actually needed for wine inoculation, since the bacteria can be frozen until needed.

The maximum nisin concentration of 100 Units/mL was chosen because virtually all nisin-sensitive bacteria are destroyed by this concentration.

Once the desired population of nisin-resistant mutants is produced, cells thereof can be left suspended in the WLAB medium and allowed to reach a population density of about $10^9$ colony-forming units per mL (CFU/mL).

To prepare a wine inoculum, the mutant cells should be transferred to a "juice medium." See Watson and Heatherbell, "Update of Industry Trials With OSU Malolactic Bacteria," 1983 *Proceedings of the Oregon Horticultural Society*, 74th Annual Report, pp. 292–297 (1983). The juice medium is comprised of grape or apple juice, plus about an equal volume of water added thereto, plus about 5% v/v "wine-yeast nutrient extract" liquid known in the art. The pH is about 3.3. "Juice medium" is autoclaved before use. The "juice medium" is then inoculated with preferably about 2% v/v of the WLAB culture of the mutants, where the WLAB culture preferably comprises about $10^9$ CFU/mL of the mutant cells. After inoculation, the "juice culture" is allowed to grow 7–10 days to allow the cell density to preferably reach about $10^8$ CFU/mL and to allow the cells to become acclimated to a wine pH.

The wine is inoculated with about 2% v/v of the juice culture, yielding an initial cell concentration in the inoculated wine within a range of about $10^4$ to about $10^7$ CFU/mL. It is preferable that the volume of inoculant added to the wine be as small as possible to avoid imparting any flavor changes to the wine from the inoculum. Therefore, it is preferable that the concentration of cells comprising the wine inoculum be within the range of about $10^7$ CFU/mL to about $10^9$ CFU/mL, and the volume of inoculum relative to the wine preferably within the range of about 0.1% v/v to about 2% v/v.

MLF of a wine can normally take about three to four weeks or longer, depending on the prevailing conditions and the style of wine. During MLF, the temperature should be kept preferably within a cellar temperature range of about 15° C. to about 20° C. The temperature can be as low as 10° C., but MLF tends to be slower at that temperature. The temperature should be kept as low as practicable within the stated preferable range to avoid imparting possibly undesirable changes to the wine.

MLF of wine according to the present invention can be performed during or after the primary fermentation. A convenient time is while the wine is undergoing aging. Aging often requires months, which is an ample amount of time for the mutant bacteria to complete MLF and to settle out of the wine after the malic acid therein has been substantially exhausted. Performing MLF after completing the primary fermentation is preferred by many European winemakers who are of the opinion that LAB, particularly indigenous LAB, present in the primary ferment can metabolize wine sugars, which may result in formation of undesirable metabolic by-products and odors. See Peynaud, *Knowing and Making Wine*, ch. 21 "Microbial Spoilage," Wiley, N.Y. (1984). Other winemakers, including many in the U.S., believe that the presence of desirable LAB in the wine, particularly a "pure culture" thereof, during the primary fermentation poses no problem whatsoever, and may actually confer a benefit. Some winemakers believe that better color and color stability of the wine result if MLF is performed slowly during aging, rather than during the primary fermentation, of the wine. Clearly, the choice as to when to perform MLF according to the present invention can be left to the winemaker's discretion, taking into consideration the style of wine, winemaking conditions, and other parameters.

The nisin need not be added to the wine simultaneously with the inoculum of nisin-resistant mutants; nisin can be added beforehand. For example, the winemaker may prefer to add nisin during the primary yeast fermentation step to inhibit undesirable bacteria. The inoculum of nisin-resistant mutants can be added later, such as during the aging step. "Pure culture" MLF is still thereby ensured because the nisin remains effective in the wine for a long period of time.

The process of the present invention is effective for reducing the concentration of malic acid in the wine to a concentration of less than 50 ppm, which is about the limit of detectability by methods currently used in the winemaking art. The initial concentration of malic acid in wine requiring MLF can vary considerably with respect to wine variety and vintage, and can be 4000 ppm or more.

The amount of nisin generally added to the wine during MLF is at least about 50 Units/mL. The preferred concentration is about 100 Units/mL, and the upper limit is about 250 to 300 Units/mL. A nisin concentration of about 100 Units/mL is effective in killing virtually all unwanted LAB (nisin works quickly) while allowing nisin-resistant mutants selected according to the present invention to carry out MLF at an acceptable rate. Concentrations in excess of the upper limit can have an adverse effect even on the nisin-resistant bacteria comprising the inoculum, where excess metabolic energy is expended by the bacteria in counteracting the high concentration of nisin, leaving an insufficient amount of energy for conducting the desired MLF. Nisin-resistant mutant bacteria exposed to excessive levels of nisin do not necessarily die but become very "sluggish" in their performance of MLF. With respect to nisin-resistant mutants derived from *L. oenos* strains Ey2d and Er1a, the former will perform MLF at an acceptable rate at a nisin concentration of about 100 Units/mL or less; the latter will perform MLF at an acceptable rate at a nisin concentration of about 70 Units/mL or less.

After MLF is completed, usually only a negligible amount of malic acid is left in the wine (less than 50 ppm). However, it is possible to halt the MLF prematurely, if desired, before all the malic acid is consumed. This can be done, for example, by adding sufficient $SO_2$ to kill the mutant bacteria, by filtering the wine, or preferably by adding additional nisin. In either event, the presence of nisin will keep the wine microbially stable and prevent the propagation of spoilage LAB, even at pH values greater than about 3.5. Also, so long as oxygen is substantially excluded from the wine, the wine can be stored for extended periods of time without danger of spoilage by oxidative bacteria or spoilage yeast.

After termination of MLF, the mutant *L. oenos* bacteria responsible therefor substantially settle to the bottom of the vessel containing the wine, making it easy to separate most of the bacteria from the wine by racking (decanting the wine), should the winemaker deem it necessary or preferable to do so. Such settling is favored by the tendency of *L. oenos* cells, which are coccobacilli, to remain attached to each other in chain-like configurations as they propagate during MLF. Chains of bacterial cells have a greater tendency than individual cells to sediment in wine. Such settling is also favored by the moderate density of wine, which is slightly less than that of water. Alternatively, the wine can be filtered to remove bacteria, bu some winemakers are reluctant to filter wine because of the possible detrimental effect filtration can have on some wines.

The present invention can be used to reduce or possibly eliminate use of sulfur dioxide ($SO_2$) in winemaking. $SO_2$ is commonly added to wine during the winemaking process as an antioxidant and to control proliferation of undesirable microbes In the free and in the bound form, $SO_2$ not only inhibits propagation of undesirable bacteria and yeasts, but also gives winemakers some control over when bacteria-mediated processes, such as MLF, occur. But, many winemakers would prefer to reduce or eliminate use of $SO_2$. According to the present invention, this can be achieved by adding nisin at any time during winemaking to inhibit undesirable LAB. The inoculum of nisin-resistant mutants can be added to the wine at the stage at which the winemaker deems it the best time to conduct MLF of the wine. The combination of nisin plus nisin-resistant mutants in the wine ensure "pure culture" MLF without fear of bacterial contamination of the wine, so long as oxygen is excluded. Also, leaving nisin in bottled wine makes it possible to reduce or eliminate the inclusion of $SO_2$ in bottled wine. The only impediment to the latter is current U.S. regulations which do not allow nisin in bottled wine.

In addition to reducing or eliminating $SO_2$ in wine, the present invention also allows minimal wine processing, such as reducing the use of or eliminating the need for filtration at the time of bottling. Many winemakers believe that minimal processing of wine offers the greatest probability of maximizing wine quality. Reducing or eliminating filtration, for example, is a particular benefit in the production of premium red wines, where filtration can cause reduction in color, aroma, and flavor.

It is also possible according to the present invention to remove the nisin from the wine after the desired MLF is completed. Nisin can be removed by contacting the wine with a nisin-removing substance. Nisin-removing substances include, but are not limited to, nisin-adsorbing substances and nisin-inactivating substances.

Nisin-adsorbing substances include, but are not limited to, certain "fining agents." Fining agents are organic or inorganic substances that generally serve to adsorb and coalesce substances such as proteins suspended in the wine which can cause clouding, thereby clarifying or polishing the wine. The coalesced substances then settle as a sediment along with the fining agent. The wine can be separated from the sediment by "racking" or decanting the wine, leaving the sediment behind.

Fining agents are generally characterized by an ability to be temporarily suspended in wine and by their ionic charge when suspended in wine. The ionic charge serves to attract suspended substances having an opposite charge, thereby facilitating coalescence of the substances. Representative fining agents include, but are not limited to, earths such as bentonite and kaolin; proteins such as gelatin, isinglass, casein, and albumin; polysaccharides such as agar; carbons; synthetio polymers such as PVPP and nylon; silicon dioxide (kieselsols); and others such as metal chelators and enzymes.

The preferred fining agent is bentonite which is believed to remove nisin by adsorption. Bentonite is comprised of hydrated aluminum silicate and is obtainable as sodium or calcium bentonite. Bentonites are comprised of platelets having edges that are positively charged and planar surfaces that are negatively charged. The adsorptive capacity of a particular bentonite varies with type, grade, degree of hydration, and other variables. Since nisin is a positively charged molecule, it probably binds to the planar surfaces of bentonite particles by ionic interactions. Bentonite is currently used in the winemaking art for clarifying wine, primarily white wine. Bentonite is used less with red wines because of the tendency of bentonite to remove some color from the wine.

The present invention is the first known use of bentonite or any other fining agent to remove an antimicrobial from wine. Since nisin is positively charged, it is expected that other fining agents having negative charge would be effective in removing nisin from wine.

Nisin-inactivating substances include, but are not limited to, various proteases, particularly acid proteases. Since nisin is a polypeptide, molecules thereof are susceptible to enzymatic degradation by proteases, especially acid proteases. For example, it is known that nisin is susceptible to chymotrypsin.

EXAMPLE 1

In this example, we investigated the ability of nisin at a concentration of 100 Units/mL in non-sterile new wine to inhibit the growth of nisin-sensitive and nisin-resistant *Leuconostoc oenos* and effect malolactic fermentation.

Nisin was obtained from Aplin and Barret, Ltd., Trowbridge, UK. The commercial preparation contained $37 \times 10^6$ international units (Units) per gram. An aqueous stock solution of 10,000 Units/mL was prepared by solubilizing the commercial nisin preparation in 0.01N. HCl (pH about 2). The stock solution was stored at 4° C. in the dark until use.

The "wine" used in this study was prepared from a grape must of Pinot Noir harvested in 1988 from the vineyard of Oregon State University. The wine had a percent by weight of dissolved solids of 21.7, as measured using a Brix hydrometer. Titratable acidity was 10.1 g/L and the pH was 3.23. $SO_2$ at a concentration of 25 ppm was added to the must at time of crush. After the primary yeast fermentation (10 days at 18° C.), the new wines were racked and subsequently kept frozen in air-tight vessels until use. Alcohol content was 11.8%.

*L. oenos* bacteria were added to the wine at inoculum levels of $1 \times 10^6$ to $1 \times 10^7$ colony-forming units (CFU) per milliliter (mL) of wine. Afterward, the inoculated wine samples were incubated at 18° C. for up to 56 days.

To determine the population level of LAB in the wine cultures, a sample from each wine culture was enumerated using sterile WLAB medium containing 1.5% agar ("WLAB agar"). To suppress yeast, 50 μg/mL filter-sterilized cyclohexamide was added to the WLAB agar. Enumeration was performed using a spread-plating technique known in the art. Cultures were incubated at 30° C. under a partial carbon dioxide atmosphere.

Malic acid was assayed enzymatically according to the method of McCloskey, "Enzymatic Assay for Malic Acid and Malo-Lactic Fermentations," *Am. J. Enol. Vitic* 31:212–215 (1980). All concentrations are sample means based on replicate determinations.

Results of the study are shown in Table I, wherein it can be seen that nisin was able to prevent the growth of either intentionally added *L. oenos* bacteria capable of MLF or naturally occurring LAB.

TABLE I

| Treatment of wine | CFU/mL of LAB (mg/mL of Malic Acid Remaining) Days After Treatment | | |
|---|---|---|---|
| | 0 | 28 | 56 |
| add *L. oenos* strain Er1a | $1.1 \times 10^6$ (3.70) | $2.5 \times 10^4$ (2.53) | $6.4 \times 10^6$ (<0.01) |
| add *L. oenos* strain Er1a + nisin | $1.1 \times 10^6$ (3.70) | <1 (4.17) | <1 (3.60) |
| add *L oenos* strain Ey2d | $1.1 \times 10^6$ (3.70) | $3.4 \times 10^4$ (3.23) | $1.0 \times 10^7$ (<0.01) |
| add *L. oenos* strain Ey2d + nisin | $1.1 \times 10^6$ (3.70) | <1 (3.97) | <1 (3.39) |
| nisin only | <1 (3.70) | <1 (4.05) | <1 (3.85) |
| none | <1 (3.70) | <1 (ND) | <1 (3.86) |

Note: ND = not detected

In the absence of nisin, *L. oenos* strains Er1a and Ey2d were able to grow, after an initial decline (observed at 28 days), to populations at 56 days greater than the initial populations (day 0) of these strains. This temporary decline in the bacterial population is typically observed and is believed to be caused by the bacteria undergoing an acclimation to the wine environment characterized by high alcohol concentration and low pH. At 56 days post treatment, essentially no malic acid was left in wines inoculated with *L. oenos* but lacking nisin. In all wines containing nisin, malic acid was still present at 56 days, even in inoculated wines. Also, at 56 days, neither viable LAB nor malic acid fermentation was evident in uninoculated wines, whether nisin was present or not.

The growth of natural LAB in wine is often variable and is dependent on initial microbial populations, the acidity of the wine, the concentration of alcohol, and availability of nutrients to the bacteria. In the present study, natural LAB was seen to grow after 5 months in the absence of nisin but not when nisin was present (data not shown).

The data in Table I was consistent with the data of Radler, "Possible Use of Nisin in Winemaking. II. Experiments to Control Lactic Acid Bacteria in Winemaking," *Am. J. Enol. Vitic.* 41:7–11 (1990), wherein 100 Units/mL of nisin added to grape must was effective in suppressing the growth of *L. oenos* in the wine when these bacteria were intentionally added to the must. Thus, nisin appears to be effective in suppressing MLF and in suppressing growth of nisin-sensitive LAB species that may otherwise cause spoilage of wine.

EXAMPLE 2

This example is an investigation of several phenomena: the ability of nisin-resistant mutants of *L. oenos* to perform MLF in new sterile wine containing nisin at a concentration inhibitory to naturally occurring LAB; the effect of nisin in inhibiting another wine spoilage bacterium *Pediococcus damnosus;* the effect of nisin on nisin-sensitive *L. oenos* strain Ey2d bacteria; and the general effect of nisin on MLF in new wine.

As described above, nisin-resistant mutants of *L. oenos* strains Ey2d and Er1a were obtained by exposure of individual populations of these strains to stepwise incrementally increasing concentrations of nisin in WLAB medium. These mutants have the ability to survive and grow in a nutrient medium containing up to 100 Units/mL of nisin.

The growth rates of nisin-sensitive *L. oenos* strain Ey2d and of a nisin-resistant mutant of this strain were determined. The growth rate, expressed as a "generation time," was determined spectrophotometrically, according to Drew, "Liquid Culture" in *Manual of Methods for General Bacteriology*, p. 151, American Society for Microbiology, Washington D.C. (1981). The nisin-resistant mutant, when grown in WLAB medium at 25° C., had a generation time about 35 percent longer than the Ey2d nisin-sensitive parent strain (11.39 hours for the mutant compared to 7.98 hours for the parent strain). The observed slower growth rate of the nisin-resistant mutant in WLAB may not be significant in wine since malolactate fermentations generally require one to three or more months to complete.

To perform the nisin resistance study, new wine was sterilized by passage through a 0.22 μm membrane filter. Aliquots of the sterile wine were individually subjected to a "treatment" as tabulated in Table II. With the exception of Treatment 1, each aliquot received an inoculum of at least one microbe. Certain treatments also received nisin at a concentration of 100 Units/mL. After inoculation, each treatment was incubated at 18° C. for three months, after which the treatments were evaluated for bacterial content. Also, the residual concentration of malic acid was determined as an indication of the amount of MLF that had occurred during the three months' incubation.

To differentially assay the wine for both *L. oenos* and *Pediococcus damnosus*, the bacteria were assayed using the LAB assay procedure as described in Example 1. To assay treatments that received both *L. oenos* and *P. damnosus*, differential enumeration of the residual bacteria was performed by counting large colonies (greater than 2 mm in diameter) as *P. damnosus* and small colonies (equal to or less than 2 mm in diameter) as *L. oenos*. Such counting was performed on inoculated WLAB agar plates that had been cultured under a partial carbon dioxide atmosphere for 96 hours at 30° C. Species differentiation was periodically confirmed by microscopic examination.

Experimental data are presented in Table II. As can be seen therein, Treatment 1 received no inoculum and no nisin. After three months, no bacteria were detectable in the wine of Treatment 1 and the concentration of malic acid remained at an "initial" level. Comparing Treatment 3 to Treatment 2, it can be seen that nisin completely inhibited the wine-spoilage bacterium *P. damnosus*. This bacterium was able to perform a partial MLF in the absence of nisin, as indicated in Treatment 2. Comparing Treatments 4 and 5, nisin completely inhibited the *P. damnosus* bacteria, but not the nisin-resistant *L. oenos* strain. In both treatments, MLF was substantially complete after 3 months. Comparing Treatments 6 and 7, nisin completely inhibited both *P. damnosus* and the nisin-sensitive Ey2d strain of *L. oenos*. Where both species were inhibited, no MLF occurred, as indicated by a high concentration of malic acid. Comparing Treatments 8 and 9, nisin had no effect on a bacterial population comprised only of the nisin-resistant mutant of *L. oenos*. Finally, comparing Treatments 10 and 11, nisin completely inhibited a bacterial population comprised solely of *L. oenos* strain Ey2d.

TABLE II

| Treatment | | Bacteria CFU/mL | | Malic Acid |
|---|---|---|---|---|
| Microbe added | Nisin | P. damnosus | L. oenos | mg/mL |
| 1. None | no | <1 | <1 | 3.51 |
| 2. P. damnosus | no | $1.6 \times 10^4$ | <1 | 1.73 |
| 3. P. damnosus | yes | <1 | <1 | 3.72 |
| 4. P. damnosus L. oenos (res) | no | $9.0 \times 10^5$ | $5.2 \times 10^7$ | <0.01 |
| 5. P. damnosus L. oenos (res) | yes | <1 | $9.3 \times 10^7$ | 0.02 |
| 6. P. damnosus L. oenos (sens) | no | $1.3 \times 10^6$ | $8.4 \times 10^7$ | 0.14 |
| 7. P. damnosus L. oenos (sens) | yes | <1 | <1 | 3.18 |
| 8. L. oenos (res) | no | <1 | $1.4 \times 10^7$ | 0.03 |
| 9. L. oenos (res) | yes | <1 | $6.8 \times 10^6$ | 0.18 |
| 10. L. oenos (sens) | no | <1 | $7.8 \times 10^7$ | 0.27 |
| 11. L. oenos (sens) | yes | <1 | <1 | 3.55 |

In Table II, malic acid was assayed enzymatically according to the method of McCloskey, "Enzymatic Assay for Malic Acid and Malo-lactic Fermentations," *Am. J. Enol. Vitic.* 31:212–215 (1980). All stated concentrations represent mean values of replicate determinations.

EXAMPLE 3

This example is an evaluation of possible nisin-inactivating activity of the nisin-resistant mutants of *L. oenos* strains Ey2d and Er1a. As a polypeptide, nisin is subject to inactivation by proteolytic enzymes, as well as by certain non-proteolytic enzymes such as "nisinase," produced by microorganisms resistant to inhibition by nisin.

"Nisinase activity" is defined herein as a loss of nisin activity due to degradation or alteration of the polypeptide, or due to binding of the polypeptide by microorganisms.

Nisinase activity was determined using methods as described by Collins-Thompson et al., "Nisin Sensitivity of Lactic Acid Bacteria Isolated from Cured and Fermented Meat Products," *J. Food Prot.* 48:668–670 (1985). Residual nisin levels were measured in cell-free supernatants from nisin-resistant and nisin-sensitive *L. oenos* cultures. Uninoculated media with and without nisin were used as controls.

Nisinase activity determinations were made on the various "treatments" evaluated in Example 2. Significant differences in residual nisin levels were not observed in nisin-containing WLAB supernatants in which nisin-resistant mutants of *L. oenos* or nisin-sensitive parent strains thereof were grown. Also, no significant differences were observed in nisin levels in wine inoculated with a nisin-resistant mutant or with a nisin-sensitive strain of *L. oenos*. These are important results because it would not be desirable to have nisin degraded when employing nisin-resistant mutants to promote a "pure culture" MLF. Otherwise, undesirable nisin-sensitive LAB could arise which would spoil the wine.

EXAMPLE 4

This example is a determination of the long-term activity of nisin in wines which have received supplementary nisin. The effectiveness of nisin in a wine environment will depend in part on the stability of the polypeptide in that environment over time.

It is known in the art that nisin is more effective in acidic environments where no interfering substances are present. Apparently, the polypeptide is more soluble and stable at low pH. Lipids, emulsifiers, and proteins are known to decrease nisin activity Fortunately, wine musts are acidic environments generally devoid of lipids and proteins. As a result, one would expect nisin to retain effectiveness in wine.

Wines used in this study were musts from grapes harvested in 1988 from an Oregon State University vineyard. Pinot Noir wine had the following parameters: 21.7 Brix, 10.1 g/L titratable acidity, and a pH of 3.23. Chardonnay wine had the following parameters: 22.3 Brix, 10.4 g/L titratable acidity, and a pH of 3.11. At the time of crush, 25 ppm $SO_2$ were added to the musts. Primary yeast fermentation was conducted for 10 days at 18° C., after which the pinot noir had 11.8% v/v alcohol and the chardonnay had 12.5% v/v alcohol. The wines were racked, then kept frozen in airtight vessels until use. Before use, the wine was sterilized by passage through 0.22 μm membrane filters.

Nisin activity was determined via a bioassay using *Pediococcus pentosaceus* strain FBB-61-2 as the nisin-sensitive "indicator" strain. Plates for performing the bioassays were prepared by adding a 0.1% inoculum of a log phase culture of the indicator strain to 35 mL of tempered WLAB agar that was then poured into petri plates. Wells having a diameter of 6.5 mm were cut into the agar surface in each plate using a sterile brass cork borer. Standard nisin solutions or nisin-containing wine samples were added to wells in volumes up to 100 μL. For enhanced detection of nisin activity, well plates containing the wine samples were allowed to prediffuse for 24 hours at 4° C. prior to incubating at 37° C. to achieve outgrowth of the indicator strain.

A decrease in nisin activity in Pinot Noir was observed after storing the wine for four months; in contrast, little to no decrease in nisin activity was observed in Chardonnay stored for the same length of time (data not shown). The presence or absence of added cultures of *L. oenos* to the initially sterile wines did not appear to have an effect on residual nisin activity. Possibly, nisin interacts with the anthocyanin compounds present in red wines such as Pinot Noir but absent in white wines such as Chardonnay.

EXAMPLE 5

This example is an evaluation of the effect of bentonite on nisin activity in wine.

To perform the evaluation, a sterile 3% w/v stock solution of commercial-grade bentonite was prepared. The bentonite was obtained from Wine-Art, Inc. Aliquots of the stock solution were added to nisin-containing sterile wines to yield wines containing bentonite at concentrations of 0.012, 0.036, and 0.060% w/v. These concentrations are within the range used by commercial wineries for clarification of wine. The wines were then allowed to remain quiescent for six hours at 22° C. and centrifuged for 10 minutes (RCF=16,000). Supernatants were assayed for nisin activity as described in Example 4.

We found that a bentonite concentration of 0.012% w/v was effective in removing almost all nisin when 10 Units/mL nisin was initially added to the wine. Bentonite at 0.060% w/v removed all nisin detectable by the bioassay. When nisin was initially added to the wine at a concentration of 100 Units/mL, even 0.060% w/v bentonite did not remove all the nisin. Nevertheless, it appears that bentonite has utility in removing nisin from wine.

EXAMPLE 6

This Example is a comparison of the ability of nisin-sensitive and nisin-resistant *L. oenos* strain Ey2d bacteria to induce MLF in Pinot Noir wine, with and without the use of $SO_2$.

Pinot Noir grapes were harvested, crushed, and destemmed. Primary fermentation was conducted using Wadensenil 27 *S. cerevisiae* yeast (Lalvin) in two lots, wherein Lot A included 50 mg/L $SO_2$ added as a liquid solution of potassium metabisulfite at time of crushing; and Lot B had no $SO_2$ added. After yeast fermentation was completed, Lots A and B were divided into eight aliquots. Each aliquot was inoculated as shown in Table III. The inoculum comprised about $10^8$ CFU/mL of the corresponding bacteria (column 4 in Table III) in "grape juice medium." The grape juice medium comprised equal volumes of grape juice (obtained from an earlier pressing of Pinot Noir grapes) and water, plus 0.5% w/v wine-yeast nutrient extract. The grape juice medium had a pH of 3.3 and was sterilized before use.

Each aliquot was evaluated after six weeks as to whether MLF was induced or not, the results of which are also shown in Table III.

TABLE III

| Lot | mg/L $SO_2$ | Nisin (Units/mL) | Bacterial Inoculum | MLF? |
|---|---|---|---|---|
| 1 | 50 | 100 | Ey2d Res | Induced |
| 2 | 50 | 100 | Ey2d Res | Induced |
| 3 | 50 | 100 | None | None |
| 4 | 50 | 100 | None | None |
| 5 | 50 | 0 | Ey2d Sens | Induced |
| 6 | 50 | 0 | Ey2d Sens | Induced |
| 7 | 50 | 0 | None | None |
| 8 | 50 | 0 | None | None |
| 9 | 0 | 100 | Ey2d Res | Induced |
| 10 | 0 | 100 | Ey2d Res | Induced |
| 11 | 0 | 100 | None | None |
| 12 | 0 | 100 | None | None |
| 13 | 0 | 0 | Ey2d Sens | Induced |
| 14 | 0 | 0 | Ey2d Sens | Induced |
| 15 | 0 | 0 | None | Induced* |
| 16 | 0 | 0 | None | Induced* |

*by naturally occurring LAB. But, MLF was substantially delayed relative to lots that received an inoculum. This represents what would occur naturally if no $SO_2$ or inoculum were added.

These results indicate that:

(1) Nisin at 100 Units/mL did not prevent MLF by nisin-resistant *L. oenos* bacteria, even in the presence of 50 mg/L $SO_2$.

(2) Nisin at 100 Units/mL prevented any MLF by nisin-sensitive *L. oenos* or indigenous LAB, whether or not $SO_2$ was present.

(3) When no nisin was present, nisin-sensitive *L. oenos* bacteria can perform MLF, even in the presence of 50 mg/L $SO_2$. There was no MLF when nisin was present.

(4) When no nisin or $SO_2$ was present, MLF was eventually induced by indigenous LAB in uninoculated wine.

Having illustrated and described the principles of our invention in several embodiments, it should be apparent to those skilled in the art that the invention can be modified in arrangement and detail without departing from such principles. We claim all modifications coming within the spirit and scope of the following claims.

We claim:

1. A method for reducing the acidity of a malic acid-containing wine, comprising the steps:
   adding nisin to the wine;

adding to the wine an inoculum comprised of cells of a nisin-resistant mutant of a species of lactic acid bacteria capable of growing in the wine, the mutant being able in the presence of nisin to convert the malic acid in the wine to lactic acid; and maintaining the inoculated wine at conditions which allow the nisin-resistant mutants to convert malic acid to lactic acid, thereby reducing the acidity of the wine.

2. A method for reducing the acidity of a wine as recited in claim 1 wherein the species of lactic acid bacteria is *Leuconostoc oenos*.

3. A method for reducing the acidity of a wine as recited in claim 1 including the step of contacting the wine with a nisin-removing substance after the acidity of the wine has been reduced so as to remove the nisin from the wine.

4. A method for reducing the acidity of a wine as recited in claim 3 wherein the nisin-removing substance is a nisin-inactivating substance.

5. A method for reducing the acidity of a wine as recited in claim 3 wherein the nisin-removing substance is a nisin-adsorbing substance.

6. A method for reducing the acidity of a wine as recited in claim 5 wherein the nisin-adsorbing substance is bentonite.

7. A method for reducing the acidity of a wine as recited in claim 6 wherein the wine is contacted with bentonite at a bentonite concentration of at least 0.012% w/v relative to the wine.

8. A method for reducing the acidity of a wine as recited in claim 7 wherein the wine is contacted with bentonite at a concentration within a range of about 0.012% w/v and 0.060% w/v relative to the wine.

9. A method for reducing the acidity of a wine as recited in claim 1 wherein the nisin is added to the wine at a concentration of at least 50 Units/mL.

10. A method for reducing the acidity of a wine as recited in claim 9 wherein the nisin is added to the wine at a concentration within a range of about 50 Units/mL to about 250 Units/mL.

11. A method for reducing the acidity of a wine as recited in claim 2 wherein the nisin-resistant strain of *Leuconostoc oenos* bacteria is resistant to nisin at a nisin concentration within a range of about 50 to about 50 Units/mL.

12. A method for reducing the acidity of a wine as recited in claim 11 wherein the nisin-resistant strain of *Leuconostoc oenos* is a mutant selected from a group consisting of strains Ey2d and Er1a of *Leuconostoc oenos*.

13. A method for reducing the acidity of a wine as recited in claim 1 wherein the nisin and the inoculum are added to the wine during a primary yeast fermentation of the wine.

14. A method for reducing the acidity of a wine as recited in claim 1 wherein the nisin and the inoculum are added to the wine after the wine has undergone a primary yeast fermentation.

15. A method for reducing the acidity of a wine as recited in claim 14 wherein the nisin and the inoculum are added to the wine during aging of the wine.

16. A method for reducing the acidity of a wine as recited in claim 2 wherein the inoculum is added to the wine to yield an initial concentration of said bacteria in the wine within a range of about $10^4$ to about $10^7$ CFU/mL.

17. A method for reducing the acidity of a wine as recited in claim 1 wherein said conditions include a temperature within a range of about 15° C. to about 20° C.

18. A method for reducing the acidity of a wine as recited in claim 1 wherein the nisin is added to the wine before the inoculum is added to the wine.

19. A method for reducing the acidity of a wine as recited in claim 18 wherein the nisin is added to the wine during a primary yeast fermentation of the wine and the inoculum is added to the wine after the primary yeast fermentation is completed.

20. A method for reducing the acidity of a wine having molecular of malic acid dissolved therein, the method comprising the steps:

adding nisin to the wine to yield a concentration of nisin in the wine of at least 50 Units/mL;

adding to the wine an inoculum comprised of cells of at least one nisin-resistant mutant of *Leuconostoc oenos* bacteria, the mutant being able in the presence of the nisin in the wine to convert molecules of malic acid in the wine to molecules of lactic acid; and maintaining the wine at a temperature within a range of about 15° C. to about 20° C. so as to allow said bacteria to convert malic acid molecules in the wine to lactic acid molecules, thereby reducing the acidity of the wine.

21. A method for reducing the acidity of a wine as recited in claim 20 including the step of contacting the wine with a nisin-removing substance after reducing the acidity of the wine to remove the nisin from the wine.

22. A method for reducing the acidity of a wine as recited in claim 21 wherein the nisin-removing substance is bentonite.

23. A method for reducing the acidity of a wine as recited in claim 20 wherein the nisin-resistant mutant of *Leuconostoc oenos* is derived from a strain selected from a group consisting of strains Ey2d and Er1a of *Leuconostoc oenos*.

24. A method for reducing the acidity of a wine as recited in claim 20 wherein the nisin is added to the wine before the inoculum is added to the wine.

25. A method for reducing the acidity of a wine as recited in claim 24 wherein the nisin is added to the wine during a primary yeast fermentation of the wine and the inoculum is added to the wine after the primary yeast fermentation is completed.

26. A method for reducing the acidity of a wine as recited in claim 20 wherein the inoculum is added to the wine to yield an initial concentration of said bacteria in the wine within a range of about $10^4$ to about $10^7$ CFU/mL.

27. A method for reducing the acidity of a wine as recited in claim 20 including the step of removing the bacteria from the wine after reducing the acidity of the wine.

28. A method for reducing the acidity of a wine as recited in claim 27 wherein the bacteria are removed from the wine by racking the wine.

29. A method for reducing the acidity of a malic acid-containing wine, comprising the steps:

obtaining a population of nisin-resistant mutants of a parent strain of a nisin-sensitive lactic acid bacterial species, where the mutants are capable of growing in the wine in the presence of a concentration of nisin that is lethal to nisin-sensitive lactic acid bacteria, by culturing cells of the parent strain in the presence of a concentration of nisin that is increased over time at least up to said lethal concentration of nisin;

culturing mutant cells derived from a colony-forming unit of said population of nisin-resistant mutants to yield a pure-culture inoculum of said mutant cells;

adding the pure-culture inoculum and nisin to the wine, where the nisin is added so as to yield a concentration of nisin in the wine that is lethal to nisin-sensitive lactic acid bacteria; and maintaining the inoculated wine under conditions permitting the pure-culture mutant cells inoculated into the wine to convert at least a portion of the malic acid in the wine to lactic acid, thereby reducing the acidity of the wine, while the nisin in the wine inhibits propagation of nisin-sensitive wine-spoilage bacteria in the wine.

30. A method for reducing the acidity of a malic acid-containing wine as recited in claim 29, wherein the population of nisin-resistant mutants of a parent strain of a nisin-sensitive lactic acid bacterial species is obtained by culturing cells of the parent strain in the presence of a concentration of nisin that begins at zero and is increased in a stepwise manner over time at least up to said lethal concentration of nisin.

31. A method for reducing the acidity of a malic acid-containing wine as recited in claim 29 wherein the parent strain is of the species *Leuconostoc oenos*.

32. A method for reducing the acidity of a malic acid-containing wine as recited in claim 31, wherein the parent strain is selected from the group consisting of strains Ey2d and Er1a of *Leuconostoc oenos*.

33. A method for reducing the acidity of a malic acid-containing wine as recited in claim 31 wherein the parent strain is cultured in the presence of a concentration of nisin that is increased stepwise over time to about 100 Units/mL.

34. A method for reducing the acidity of a malic acid-containing wine as recited in claim 33 wherein nisin is added to the wine at a concentration of at least 50 Units/mL.

35. A method for reducing the acidity of a malic acid-containing wine as recited in claim 29, wherein the pure-culture inoculum is added to the wine at a concentration sufficient to yield in the wine a concentration of pure-culture mutant cells within a range of about $10^4$ to about $10^7$ CFU/mL of wine.

36. A method for reducing the acidity of a malic acid-containing wine as recited in claim 29, including the step of removing the nisin from the wine.

37. A method for reducing the acidity of a malic acid-containing wine as recited in claim 35, wherein the step of removing the nisin from th wine comprises contacting the wine with a nisin-adsorbing substance.

38. A method for reducing the acidity of a malic acid-containing wine as recited in claim 36, wherein the nisin-adsorbing substance is bentonite.

* * * * *